United States Patent [19]
Nakanishi

[11] Patent Number: 5,408,360
[45] Date of Patent: Apr. 18, 1995

[54] PLASTIC LENS

[75] Inventor: Hiroshi Nakanishi, Tokyo, Japan

[73] Assignee: Canon Kabushiki Kaisha, Tokyo, Japan

[21] Appl. No.: 264,847

[22] Filed: Jun. 22, 1994

Related U.S. Application Data

[63] Continuation of Ser. No. 154,125, Nov. 18, 1993, abandoned, which is a continuation of Ser. No. 68,316, May 28, 1993, abandoned, which is a continuation of Ser. No. 906,453, Jun. 30, 1992, abandoned.

[30] Foreign Application Priority Data

Jul. 3, 1991 [JP] Japan ..................... 3-189241
Jun. 3, 1992 [JP] Japan ..................... 4-142756

[51] Int. Cl.⁶ ............. G02B 1/04; G01D 9/42; C08F 10/00
[52] U.S. Cl. ................ 359/642; 342/258; 359/196; 526/282
[58] Field of Search ........ 359/642, 196; 526/281, 526/282; 346/108

[56] References Cited

U.S. PATENT DOCUMENTS

| | | | |
|---|---|---|---|
| 4,432,022 | 2/1984 | Tokumitsu | 358/250 |
| 4,512,632 | 4/1985 | Tokumitsu et al. | 359/619 |
| 4,523,801 | 6/1985 | Baba et al. | 359/218 |
| 4,874,808 | 10/1989 | Minami et al. | 526/281 |
| 4,957,990 | 9/1990 | Sudo et al. | 526/282 |

Primary Examiner—Scott J. Sugarman
Attorney, Agent, or Firm—Fitzpatrick, Cella, Harper & Scinto

[57] ABSTRACT

A plastic lens used for an optical system using a laser light source is made of a plastic material having a modulus of photoelasticity at a wavelength of 632.8 nm of larger than zero but no larger than $60 \times 10^{-13}$ cm²/dyne. The plastic lens satisfies a condition that a product $W \times D/H$ is larger than zero but no larger than 4, where D is a maximum thickness of the plastic lens along an optical axis in a light beam effective diameter, H is a lens outer diameter and W (%) is a saturation moisture absorption factor as a temperature of 50° C. and a humidity of 95%.

68 Claims, 7 Drawing Sheets

295

PLASTIC LENS

This application is a continuation of application Ser. No. 8/154,125, filed Nov. 18, 1993, now abandoned, which is a continuation of Ser. No. 08/068,316, filed May 28, 1993, now abandoned, which is a continuation of Ser. No. 07/906,453, filed Jun. 30, 1992, now abandoned.

BACKGROUND OF THE INVENTION

1. Field of the Invention

The present invention relates to a plastic lens to be used for an optical system (laser optical system) for a laser light source, and more particularly to a plastic lens suitable for use in a lens of a laser scanning optical system of a laser beam printer or a pickup optical system for an optical disk.

2. Related Background Art

A lens made of a glass material has been used in the optical system of the optical pickup and the optical system of the laser beam printer.

When a lens to be used in the optical system for the laser light source (hereinafter referred to as a laser optical system) is made of polymethyl methacrylate resin and a temperature and a humidity which are environmental conditions of the optical system are changed (for example, 20° C., 50% to 50° C., 95%), an optical performance usually varies so that a focus point significantly varies.

The variation of the focus point greatly depends on a lens shape, particularly a ratio D/H of a lens thickness D and a lens outer diameter (or lens height) H.

When the lens for the laser optical system is made of polycarbonate resin or polystyrene resin, the variation of the focus point due to the change of humidity of the environmental condition is smaller.

However, when beam shapes before and after the laser beam passing through the lens are compared, the beam shape of the laser beam before it passes through the lens is generally circular while the beam shape of the laser beam after it passes through the lens is elliptic or divided into two parts like a figure "8".

On the other hand, when the laser beam passes through a lens made of polymethyl methacrylate resin, the variation of the focus point due to the change of humidity is large but the change of the beam shape before and after the light beam passes through the lens is not significantly changed.

SUMMARY OF THE INVENTION

It is an object of the present invention to provide a plastic lens which compensates for a variation of an optical performance of the plastic lens to a humidity, particularly a variation of a focus point of properly designing a shape of the lens and also effectively compensates for deterioration of a shape of a laser beam after the passage of the laser beam through the plastic lens.

The plastic lens of the present invention to be used for an optical system for a laser light source is made of a plastic material having a modulus of photoelasticity at 632.8 nm of larger than zero and no larger than $60 \times 10^{-13}$ cm$^2$/dyne and has such a lens shape that $W \times D/H$ is larger than zero and no larger than 4, where D is a maximum thickness of the plastic lens along an optical axis in a light beam effective diameter, H is a lens outer diameter and W is a saturation moisture absorption factor (%) of the plastic material at the temperature of 50° C. and the humidity of 95%.

DETAILED DESCRIPTION OF THE PREFERRED EMBODIMENTS

Figure 1:
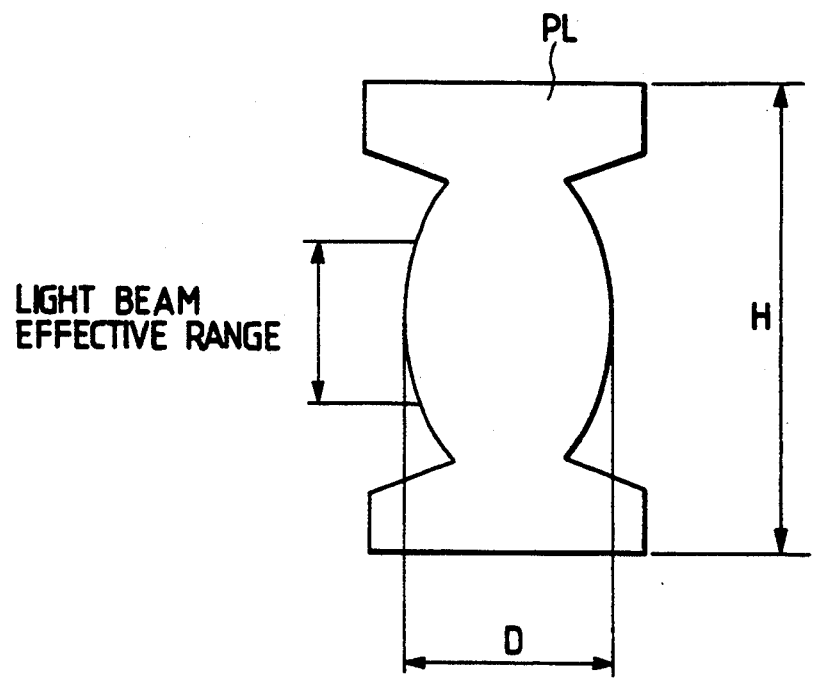
FIG. 1 shows a sectional view of an embodiment-1 of the lens of the present invention.
Figure 2:
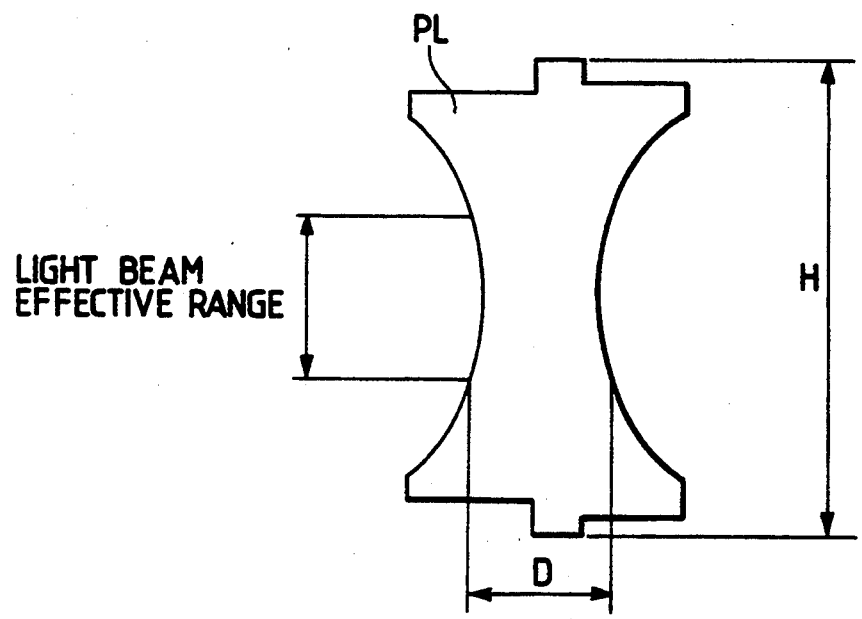
FIG. 2 shows a sectional view of an embodiment-2 of the lens of the present invention.

FIGS. 1 and 2 show sectional views of lenses in embodiments 1 and 2 of the plastic lens PL of the present invention. The plastic lens PL of FIG. 1 is a positive lens and a plastic lens PL of FIG. 2 is a negative lens.

D denotes a maximum thickness of the plastic lens PL along an optical axis in a light beam effective diameter, and H denotes an outer diameter (lens height) of the plastic lens PL.

In the present embodiment, a modulus of photoelasticity C of the material of the plastic lens PL, a maximum thickness D, a lens outer diameter H and a saturation moisture absorption factor W are defined as described above to effectively compensate for the variation of the focus point (the variation of the refractive power) caused by the change in humidity of atmosphere and the deterioration of a shape of light beam after the passage through the lens.

Characteristics of the plastic lens of the present invention are now explained.

The focus point of the plastic lens used in the laser optical system significantly changes when the environmental humidity changes. Regarding this fact, it has been found that it correlates to a refractive index distribution of the material caused in the lens.

Figure 3:
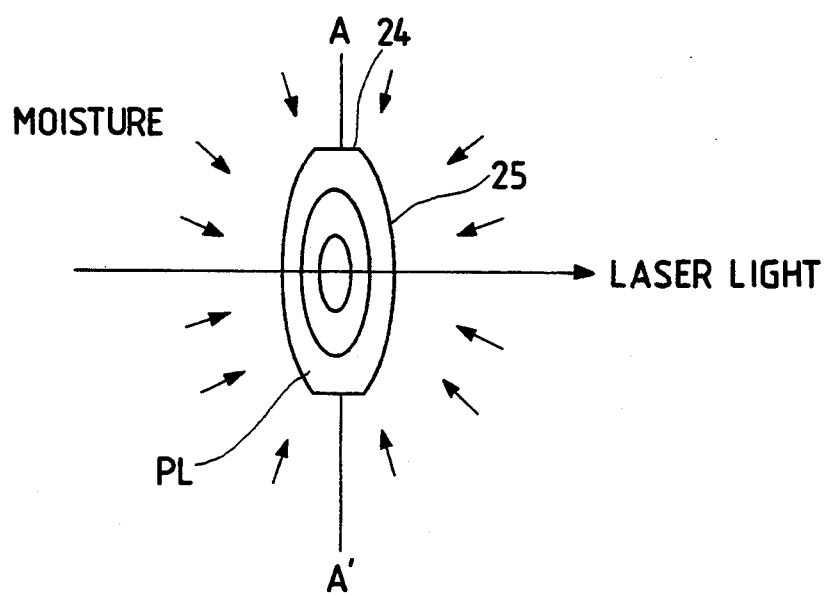
FIG. 3 illustrates a refractive index distribution caused by the impregnation of moisture into the lens.
Figure 4:
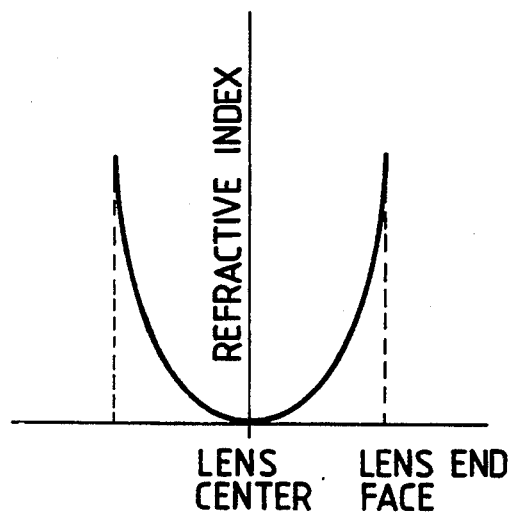
FIG. 4 illustrates a refractive index distribution in a section A-A' of FIG. 3.

FIG. 3 shows a distribution of density caused in the plastic lens PL by the impregnation of moisture into the lens when the lens is placed from a room temperature and room humidity environment to a high humidity environment. The density distribution is substituted by a refractive index distribution by the Lorentz-Lorenz's formula and the refractive index is high in an area into which the moisture has impregnated. In this case, a refractive index distribution caused in a section (section A-A' in FIG. 3) normal to the travelling direction of the laser beam significantly affects to the variation of the focus point. (See FIG. 4 which shows the refractive index distribution in the section A-A' of the plastic lens PL of FIG. 3) The refractive index distribution changes from time to time as the moisture impregnates and the focus point also changes from time to time accordingly.

Figure 5:
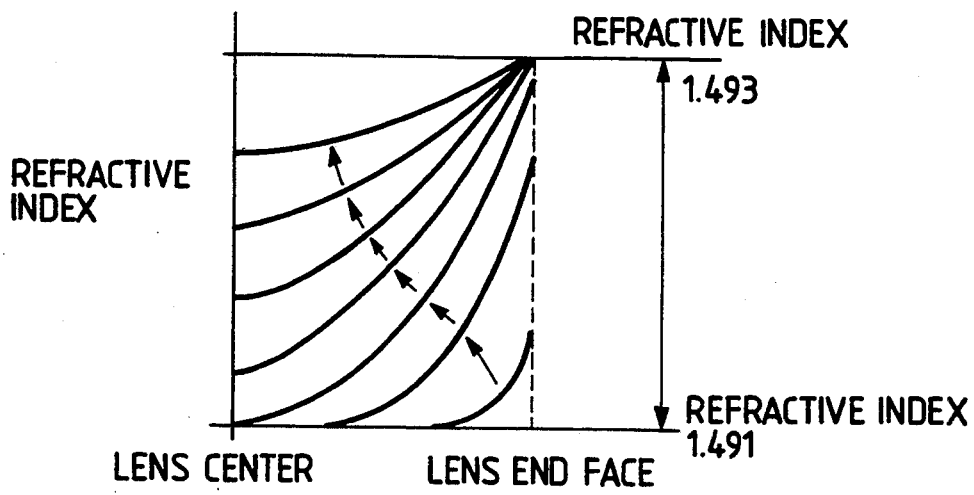
FIG. 5 illustrates a change in the refractive index distribution due to the impregnation of the moisture into the lens.
Figure 6:
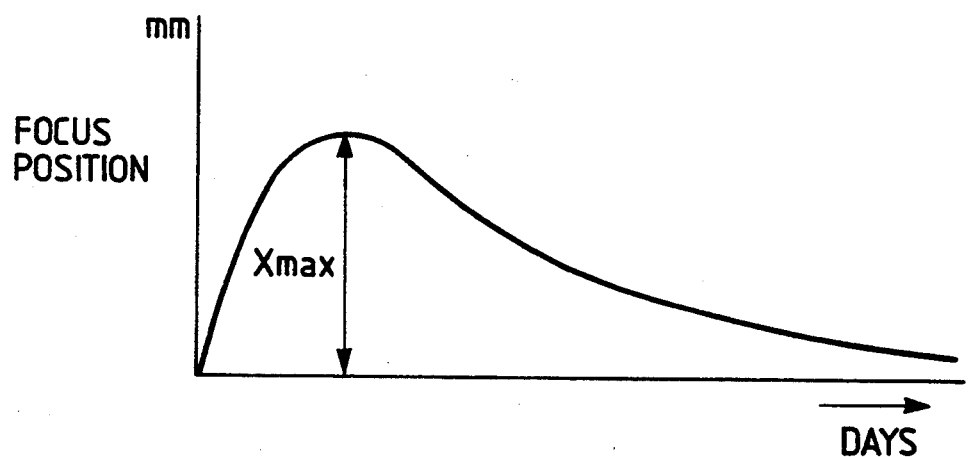
FIG. 6 illustrates a change in a focus point due to the change in the refractive index distribution of the lens of FIG. 5.

FIGS. 5 and 6 illustrate such the aspect. When the lens made of polymethyl methacrylate resin is used, the refractive index before the test is substantially uniformly 1.491. When it is moved from the room temperature and room humidity environment to the high humidity environment, the refractive index on an end face of the plastic lens first changes to 1.493, and the change of the refractive index thereafter gradually extends to the center of the lens and the refractive index approaches to 1.493 as shown in FIG. 5.

Assuming that the shape of the plastic lens PL is fixed, a maximum displacement $X_{MAX}$ (see FIG. 6) of the focus point is proportional to a maximum refractive index distribution (=maximum differential refractive index) $N_{MAX}$ (see FIG. 5) in the section A-A' of FIG. 3 and it is expressed by:

$$X_{MAX} = B_1 \cdot N_{MAX}$$

where $B_1$ is a constant.

The maximum refractive index distribution (=maximum differential refractive index) $N_{MAX}$ is also proportional to the saturation moisture absorption factor W (%) of the plastic material and it is expressed by:

$$N_{MAX} = B_2 \cdot W$$

where $B_2$ is a constant.

In the present embodiment, the saturation moisture absorption factor W (%) is given by $$W(\%) = (W_a - W_o)/W_o \times 100$$

where $W_o$ is a weight of the plastic lens in an absolute dry state, and $W_a$ is a weight of the plastic lens when the plastic lens is left in an environment of a temperature of 50° C. and a humidity of 95% until the change in the weight ceases. Assuming that the shape of the plastic lens is constant, the following is met.

$$X_{MAX} = B_3 \cdot W \qquad (1)$$

where $B_3$ is a constant.

Figure 7:
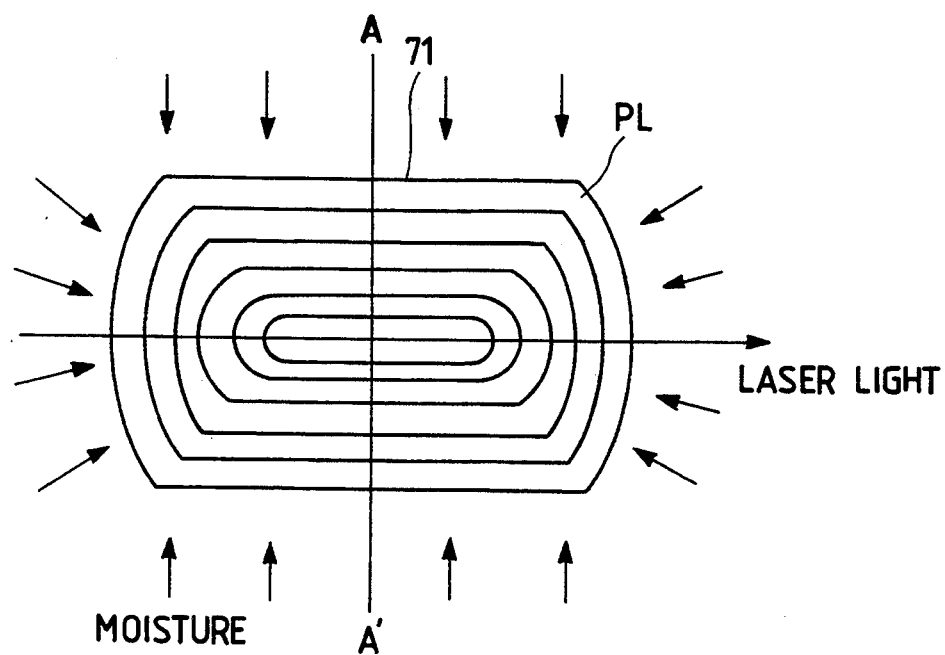
FIG. 7 illustrates a refractive index distribution caused in the lens by the impregnation of the moisture into the lens.

The refractive index distribution in the plastic lens greatly varies with the lens shape. In the plastic lens having the lens shape shown in FIG. 3, the impregnation of the moisture through the lens plane 25 is dominant. On the other hand, in a plastic lens PL having a lens shape shown in FIG. 7, the impregnation through a peripheral surface 71 is dominant. The displacement of the focus point is larger in the plastic lens shown in FIG. 7 than in the plastic lens of FIG. 3.

Assuming that the saturation moisture absorption factor of the plastic material is constant, the maximum refractive index distribution $N_{MAX}$ in the section A—A' of the lens of FIG. 3 is proportional to the ratio D/H of the maximum thickness D of the plastic lens along the optical axis in the light beam effective diameter and the effective lens diameter (lens height) H as defined in FIGS. 1 and 2, and it is expressed by $$N_{MAX} = B_4 \cdot D/H$$

where $B_4$ is a constant.

Since the maximum refractive index distribution $N_{MAX}$ is proportional to the maximum focus point displacement $X_{MAX}$ as described above, the following is met.

$$X_{MAX} = B_5 \cdot D/H \qquad (2)$$

where $B_5$ is a constant.

Thus, the maximum focus point displacement $X_{MAX}$ is determined by the saturation moisture absorption factor W (%) of the plastic material and the ratio D/H of the maximum thickness D and the effective lens diameter H. From the formulas (1) and (2), the following condition should be met in order to meet a predetermined optical performance.

$$X_{MAX} \leq B_6 \cdot W \cdot D/H$$

where $B_6$ is a constant.

Namely, where a material having a large saturation moisture absorption factor W (%) is used, the ratio D/H should be small, and where a material having small W (%), the ratio D/H may be large.

It is preferable from the standpoint of the optical performance required for the laser optical system that the products $W \times D/H$ of the ratio D/H and the saturation moisture absorption factor W (%) of the plastic material at a temperature of 50° C. and a humidity of 95% is larger than zero and no larger than 4, where D is the maximum thickness of the plastic lens in the light beam effective range and H is the effective lens diameter.

It has been found that the deterioration of the spot shape of the laser beam after it passes through the plastic lens is determined by a modulus of photoelasticity of the plastic material.

When the plastic lens is formed, a shearing stress or a thermal stress remains in the lens depending on a manner of flow and cooling of the plastic material. Those residual stresses cause double refraction in proportion to a modulus of photoelasticity of the plastic material.

The following relation is met $$\Delta n = C \cdot S$$

where $\Delta n$ is an amount of double refraction, C is a modulus of photoelasticity and S is a residual stress.

The deterioration of the spot shape of the light beam is determined by the amount of double refraction ($\Delta n$) in the plastic lens. The amount of double refraction $\Delta n$ is determined by two variables, the modulus of photoelasticity C of the plastic material and the residual stress S. In case of forming a plastic lens, a molding should be conducted so as not to occur a sinkmark. Since certain amount of residual stress S inevitably occurs, S may be regarded as a constant. Accordingly the double refraction occurs in proportion to the modulus of photoelasticity C which is inherent to the material.

In the present invention, the plastic lens material for the laser optical system has the modulus of photoelasticity C at a wavelength of 632.8 nm of larger than zero and no larger than $60 \times 10^{-13}$ cm²/dyne in order to attain a good optical performance. The saturation moisture absorption factors W at the temperature of 50° C. and the humidity of 95% and the moduli of photoelasticity C at the wavelength of 632.8 nm, of representative plastic lenses are shown in Table 1.

TABLE 1

|  | Saturation Moisture Absorption Factor W (%) | Modulus of Photoelasticity C $\times 10^{-13}$ cm$^2$/dyne |
| --- | --- | --- |
| Polymethyl Methacrylate | 2.0 | 6–7 |
| Copolymer of acrylate compound and sthylene compound or mixture of polymer of its compound | 2.0–0.1 | 7–90 |
| Polycarbonate | 0.35 | 70–80 |
| Copolymer of carbonate compound and sthylene compound or mixture of polymer of its compound | 0.35–0.1 | 20–90 |
| Polysthylene | 0.1 | 90 |
| Amorphous or crystalline olefin polymer | No larger than 0.1 | 6–8 |
| Norbornene polymer | 0.35 | 4–5 |

Figure 8:
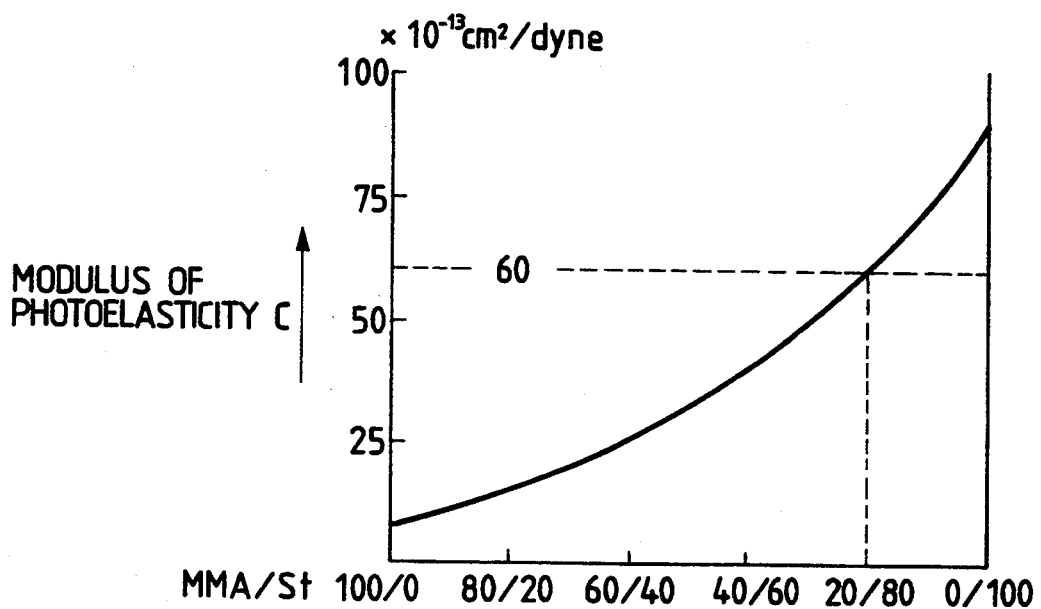
FIG. 8 illustrates a change in a modulus of photoelasticity of a plastic material.

In a copolymer of an acrylate compound and a stylene compound or a mixture of a polymer of its compound, the modulus of photoelasticity C significantly changes with a compounding ratio thereof as shown in FIG. 8.

When MS resin is used, a compounding ratio of methyl methacrylate and sthylene is set to $$20/80 \leq MMA/St \leq 100/0 (=PMMA)$$

in order the modulus of photoelasticity C at the wavelength of 632.8 nm to meet the condition of larger than zero and no larger than $60 \times 10^{-13}$ cm$^2$/dyne. The upper limit MMA/St=100/0 means that MMA is included at 100% and it means PMMA resin.

Figure 9:
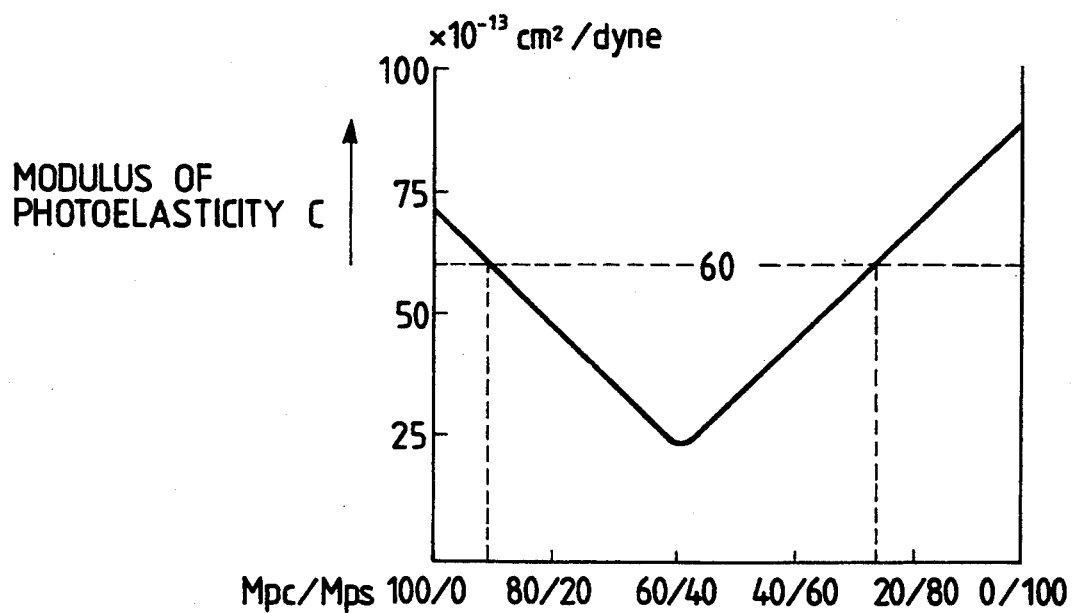
FIG. 9 illustrates a change in a modulus of photoelasticity of a plastic material.

When the copolymer of the carbonate compound and the sthylene compound or mixture of polymer of its compound is used, the modulus of photoelasticity C significantly changes with weight ratios of the constituents as shown in FIG. 9. In the present invention, the following condition is met;

$$25/75 \leq Mpc/Mps \leq 90/10$$

where Mpc is a weight of polycarbonate constituent and Mps is a weight of sthylene compound polymer constituent in order for the modulus of photoelasticity C at the wavelength of 632.8 nm to meet the condition of no larger than $60 \times 10^{-13}$ cm$^2$/dyne.

Figure 10:
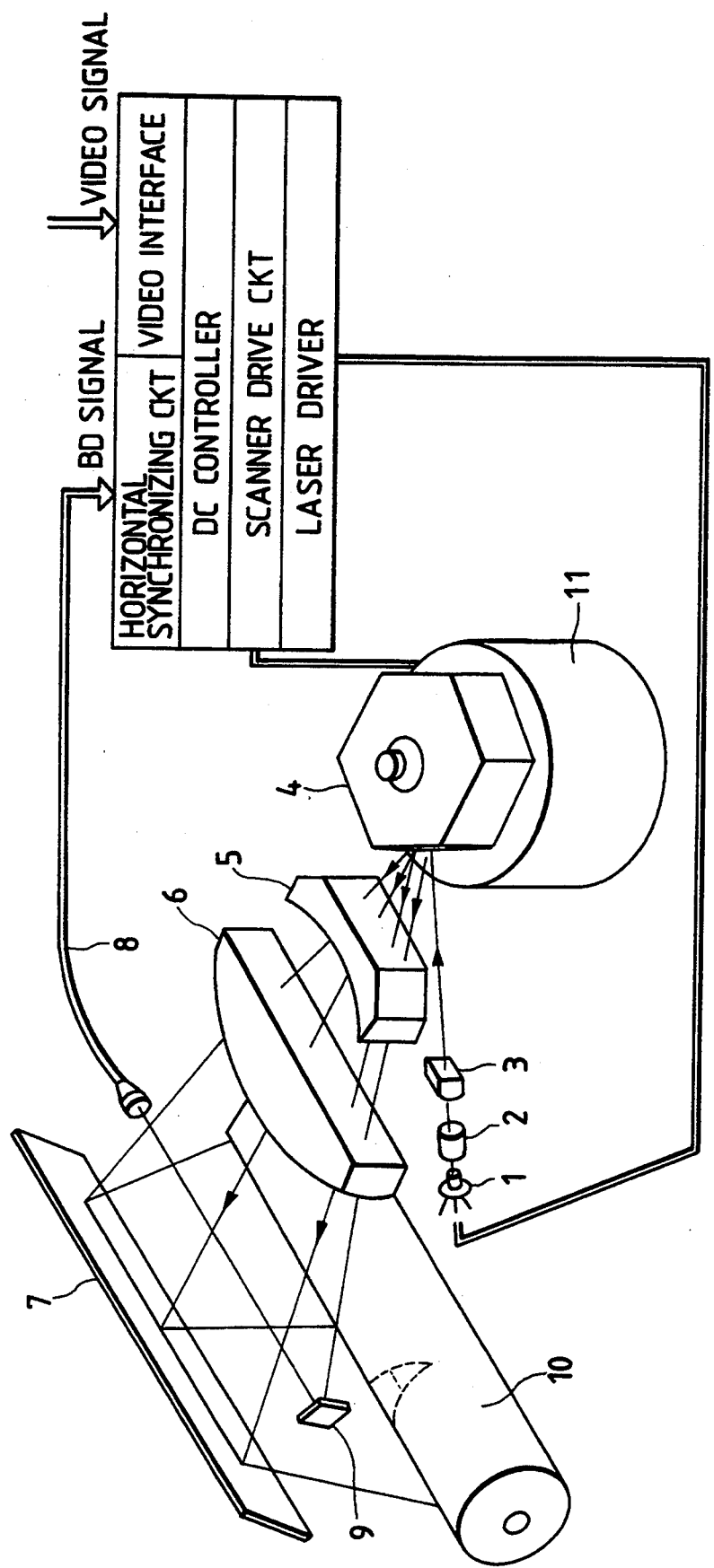
FIG. 10 shows a schematic view of an embodiment in which the plastic lens of the present invention is applied to a laser beam printer.

FIG. 10 shows a schematic view of a first embodiment of the present invention which uses the plastic lens of the present invention. The present embodiment is applied to a laser scan optical system of a laser beam printer. Numeral 1 denotes a laser diode as a light source, numeral 2 denotes a collimator lens and numeral 3 denotes a cylindrical lens. A laser beam from the laser 1 is focused on a surface of a polygon mirror 4 by the collimator lens 2 and the cylindrical lens 3.

The light source 1 through the polygon mirror 4 form a primary focusing system. Numeral 5 denotes a spherical lens and numeral 6 denotes a toric lens. An fθ lens system is constructed by the spherical lens 5 and the toric lens 6. The laser beam transmitted through the spherical lens 5 and the toric lens 6 is reflected by a reflection mirror 7 and focused on a photosensitive drum 10. The polygon mirror 4 to the photosensitive drum 10 form a secondary focusing system.

In the present embodiment, the collimator lens 2, the cylindrical lens 3 the spherical lens 5 and the toric lens 6 in FIG. 10 are made of plastic materials. The moduli of photoelasticity C of the plastic lens materials at the wavelength of 632.8 nm to meet the optical performance as the laser beam printer are shown in Table 2.

In Table 2, the copolymers (MS resin) of methyl methacrylate and sthylene of various compounding ratios which meet the modulus of photoelasticity between 7 and 90 are shown. Some compositions exhibit somewhat white turbidity depending on the compounding ratio of the methyl methacrylate and sthylene but it is of a level which does not affect to the measurement.

TABLE 2

|  | C; Modulus of photoelasticity $\times 10^{-13}$ cm$^2$/dyne |
| --- | --- |
| Collimator lens | $0 < C \leq 10$ |
| Cylindrical lens | $0 < C \leq 20$ |
| Spherical lens | $0 < C \leq 50$ |
| Toric lens | $0 < C \leq 60$ |

Table 2 indicates that when the collimator lens is substituted by a plastic lens made of a plastic material and other lenses, that is, the cylindrical lens, the spherical lens and the toric lens are glass lenses, for example, the modulus of photoelasticity of the plastic material of the collimator lens at the wavelength of 632.8 nm should be no larger than $10 \times 10^{-13}$ cm$^2$/dyne.

As seen from Table 2, the farther the lens is optically displaced from the laser diode 1, the less severe is the required characteristic of the plastic lens, but the modulus of photoelasticity of even the toric lens 6 at the wavelength of 632.8 nm should be larger than zero and no larger than $60 \times 10^{-13}$ cm$^2$/dyne in order to keep the required optical performance.

The displacement of the focal point as the change in the optical performance which is caused when the plastic lens is moved from a room temperature and room humidity environment to a high humidity environment (for example, temperature of 50° C. and humidity of 95%) in a conventional laser beam printer is discussed below.

Figure 11:
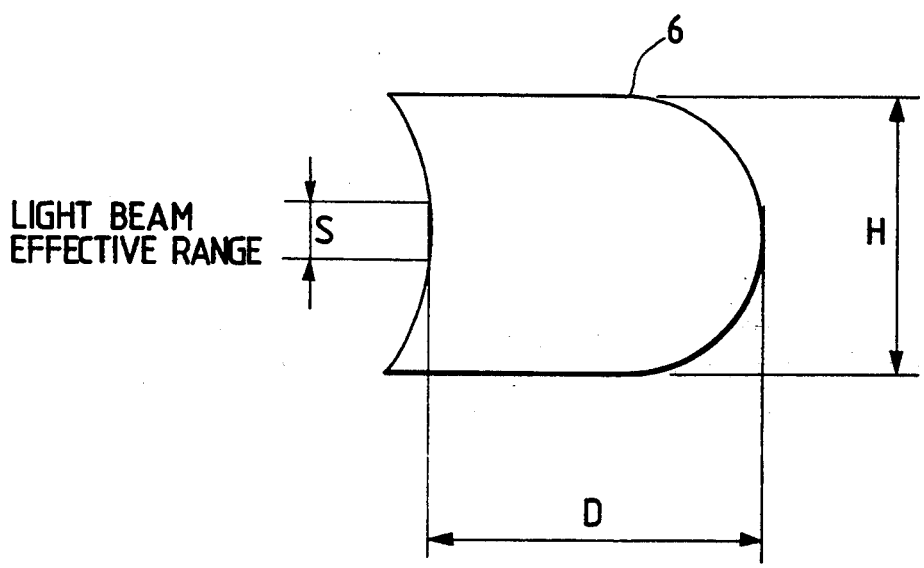
FIG. 11 shows a sectional view of the plastic lens.

FIG. 11 shows a shape of a section taken along a center line of the toric lens 6. The light beam effective range S is 3 mm and the maximum thickness D within that range is 20 mm. The effective lens diameters (lens heights) H required for the toric lens 6 when it is made plastic materials having different saturation moisture absorption factors at the temperature of 50° C. and the humidity of 95% are shown in Table 3.

TABLE 3

| Plastic Material | Saturation Moisture Absorption Factor W | Effective Lens Diameter H | D/H | W × D/H |
| --- | --- | --- | --- | --- |
| Polymethyl methacrylate (Mitsubishi Rayon Acrypet VH) | 2.0% | $\geq 10$ mm | $\leq 2$ | $>0$ and $\leq 4$ |

TABLE 3-continued

| Plastic Material | Saturation Moisture Absorption Factor W | Effective Lens Diameter H | D/H | W × D/H |
|---|---|---|---|---|
| Acrylate Polymer (Hitachi Chemical Optoletz OZ-1000) | 1.2% | ≥6 mm | ≤10/3 | >0 and ≤4 |
| MS resin (Denki Kagaku TX-100-300L) | 0.8% | ≥4 mm | ≤5 | >0 and ≤4 |

As for the material having the saturation moisture absorption factor of smaller than 0.8%, the effective lens diameter H is within the light beam effective range. Therefore, the effective lens diameter H was not measured for such toric lens 6.

As seen from Table 3, the product W×D/H of the ratio D/H and the saturation moisture absorption factor W (%) of the plastic material at the temperature of 50° C. and the humidity of 95%, where D is the maximum thickness in the light beam effective range and H is the effective lens diameter, meets the condition of greater than zero and no greater than 4 to maintain a good optical performance.

It is preferable that the values of W×D/H of the collimator lens, the cylindrical lens and the spherical lens are smaller than that of the toric lens.

This is explained below for the collimator lens 2.

Since the collimator lens 2 is disposed closest to the laser diode 1, the required precision for the change of humidity is severe as it is for the modulus of photoelasticity.

Figure 13:
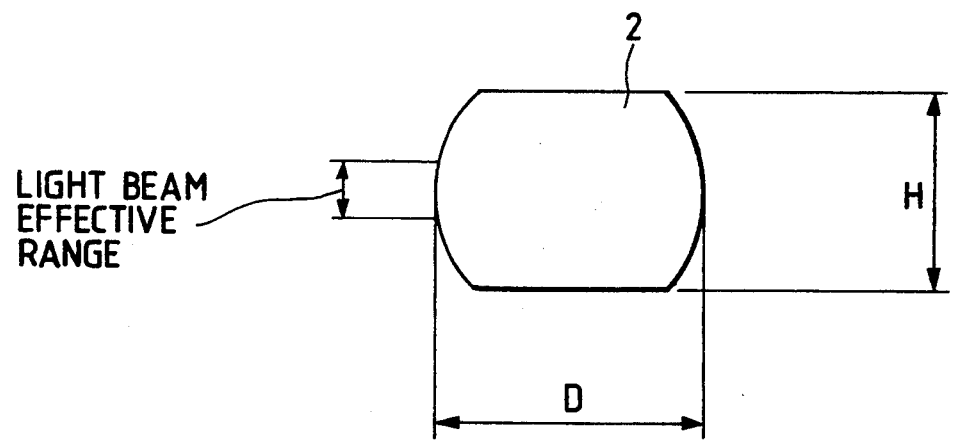
FIG. 13 illustrates a shape of a section of a collimator lens 2 of FIG. 10.

A shape of a section of the collimator lens 2 of FIG. 10 is shown in FIG. 13. The light beam effective range S is 1.5 mm and the maximum thickness D within that range is 8 mm.

The effective lens diameters (heights) H required for the collimator lens 2 when it is made by plastic materials having different saturation moisture absorption factors at the temperature of 50° C. and the humidity of 95% are shown in Table 4.

TABLE 4

| Plastic material | Saturation Moisture Absorption Factor W | Effective Lens Diameter H | D/H | W × D/H |
|---|---|---|---|---|
| Polycarbonate (Teijin Chemical Panlyte AD5503) | 0.35% | ≥14 mm | ≤0.57 | >0 and ≤0.2 |
| Norbornene polymer (Japan Synthetic Rubber Arton) | 0.3% | ≥12 mm | ≤0.67 | >0 and ≤0.2 |
| Copolymer of polycarbonate compound and sthylene compound (Mitsubishi Gas Chemical Upiron ODX) | 0.25% | ≥10 mm | ≤1.25 | >0 and ≤0.2 |
| Polysthylene (Asahi Kasei Stylon) | 0.1% | ≥4 mm | ≤2.0 | >0 and ≤0.2 |
| Amorphous olefin polymer (Nippon Zeon Zeonex 480S) | 0.05% | ≥2 mm | ≤4.0 | >0 and ≤0.2 |
| Crystalline olefin polymer (Mitsui Petrochemical TPX-RT18) | 0.05% | ≥2 mm | ≤4.0 | >0 and ≤0.2 |

As seen from Table 4, a good optical performance of the collimator lens is maintained when the ratio D/H of the maximum thickness in the light beam effective range and the effective lens diameter H is larger than zero and no larger than 4 and the products W×D/H of the ratio D/H and the saturation moisture absorption factor W (%) of the plastic material at the temperature of 50° C. and the humidity of 95% is larger than zero and no larger than 0.2.

Figure 12:
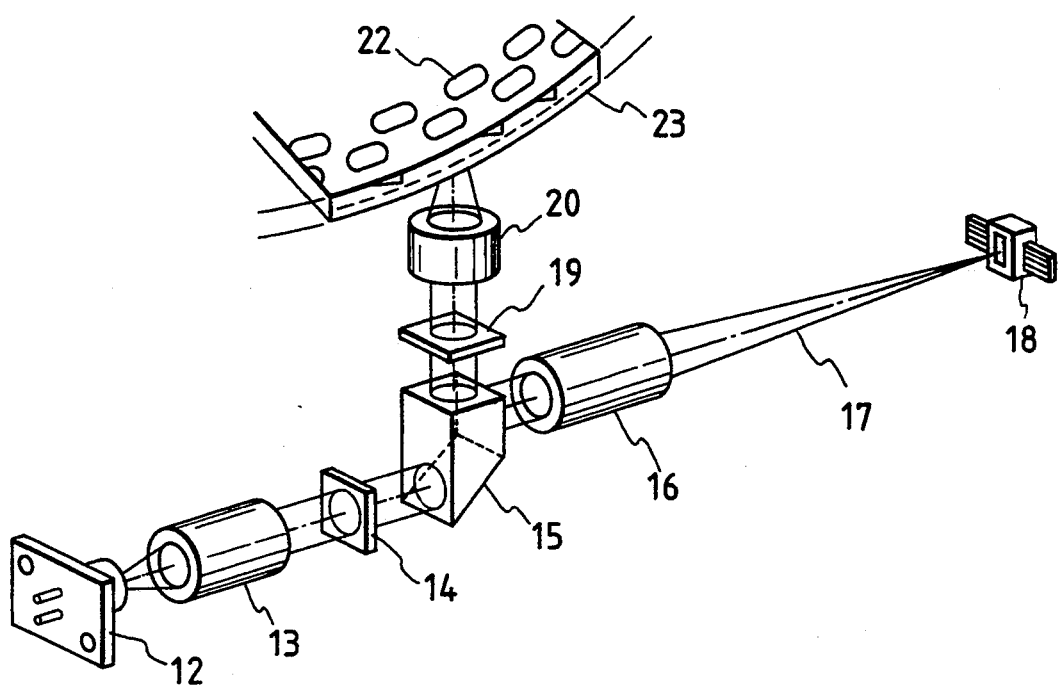
FIG. 12 shows a schematic view in which the plastic lens of the present invention is applied to an optical system of a pickup for an optical disk.

FIG. 12 shows a schematic view of a second embodiment which uses the plastic lens of the present invention. The present embodiment is applied to an optical system of a pickup for an optical disk. Numeral 12 denotes a laser diode as a light source, numeral 13 denotes a collimator lens for collimating the laser beam, numeral 14 denotes a grating, numeral 15 denotes a beam splitter, numeral 16 denotes a detector lens, numeral 18 denotes a photo-detector, numeral 19 denotes a wavelength plate, numeral 20 denotes an objective lens and numeral 22 denotes pits formed on a disk 23.

In the present embodiment, the laser beam emitted from the laser diode 12 passes through the collimator lens 13 and the grating 14 and is directed to the beam splitter 15. It is reflected thereby at a right angle, passes through the wavelength plate 19 and the objective lens 20 and is directed to the disk 23 on which the pits 22 are formed. The laser beam reflected by the disk 23 goes back along the initial path through the objective lens 20 and the wavelength plate 19, is reflected by the reflection plane of the beam splitter 15 at a right angle, passes through the detector lens 16 and is directed to the photo-detector 18.

In the embodiment of FIG. 12, the collimator lens 13, the objective lens 20 and the detector lens 16 are made by plastic materials.

The moduli of photoelasticity C of the lens materials at the wavelength of 632.8 nm required to meet the optical performance as the optical system of the optical disk are shown in Table 5. The measurement is same as that of the embodiment 1 described above.

TABLE 5

| | Modulus of photoelasticity × $10^{-13}$ cm$^2$/dyne |
|---|---|
| Collimator lens | >0 and ≤20 |
| Objective lens | >0 and ≤60 |
| Detector lens | >0 and ≤20 |

In the optical system of the pickup for the optical disk, the requirement for the objective lens is least severe as shown in Table 5. Even for the objective lens, however, it is preferable that the modulus of photoelasticity at the wavelength of 632.8 nm is larger than zero and no larger than $60 \times 10^{-13}$ cm$^2$/dyne in order to maintain a good optical performance.

The variation of the focus point as the change of optical performance caused when the environmental humidity changes is discussed below.

The plastic lens of FIG. 1 shows the shape of the objective lens 20 under such the condition.

The light beam effective range is 1.5 mm and the maximum thickness D within that range is 6 mm.

The effective lens diameters (lens heights) H required for the plastic lens 20 when it is made by plastic materials of different saturation moisture absorption factors at the temperature of 50° C. and the humidity of 95% are shown in Table 6.

TABLE 6

| Plastic material | Saturation moisture absorption factor W | Effective lens diameter H | D/H | W × D/H |
|---|---|---|---|---|
| Polymethyl methacrylate (Mitsubishi Rayon Acrypet VH) | 2.0% | ≧3 mm | ≦2 | >0 and ≦4 |
| Acrylate polymer (Hitachi Chemical Optoletz OZ-1000) | 1.2% | ≧1.8 mm | ≦10/3 | >0 and ≦4 |

As for the material having the saturation moisture absorption factor of smaller than 1.2%, the effective lens diameter is within the light beam effective range. Therefore, the effective lens diameter is not measured.

In the present embodiment, the product W×D/H of the ratio D/H and the saturation moisture absorption factor W (%) of the plastic material at the temperature of 50° C. and the humidity of 95%, where D is the maximum thickness in the light beam effective range and H is the effective lens diameter is larger than zero and no larger than 4 as shown in Table 6 in order to maintain a good optical performance.

It is preferable that the products W×D/H of the collimator lens and the detector lens are smaller than that of the objective lens.

In accordance with the present invention, when the plastic lens is used for the optical system of the laser light source, the plastic material having the modulus of photoelasticity at the wavelength of 632.8 nm of greater than zero and no greater than $60 \times 10^{-13}$ cm$^2$/dyne is used and the product W×D/H of the ratio D/H of the maximum thickness D of the lens along the optical axis in the light beam effective range and the effective lens diameter H, and the saturation moisture absorption factor W (%) of the plastic material at the temperature of 50° C. and the humidity of 95% is selected to be larger than zero and no larger than 4. As a result, the plastic lens which solves the problems of the deterioration of the beam shape due to the double refraction and the change of the focus point as the change of the optical performance caused by the change of the environmental humidity is attained.

What is claimed is:

1. A plastic lens for use in an optical system for a laser light source made of a plastic material having a modulus of photoelasticity at 632.8 nm of larger than zero and no larger than $60 \times 10^{-13}$ cm$^2$/dyne and having a product W×D/H of larger than zero and no larger than 4, where D is a maximum thickness of the plastic lens along an optical axis in a light beam effective diameter, H is a lens outer diameter and W (%) is a saturation moisture absorption factor at a temperature of 50° C. and a humidity of 95%.

2. A plastic lens according to claim 1, wherein said plastic material is amorphous or crystalline olefin resin.

3. A plastic lens according to claim 1, wherein said plastic material is PMMA resin.

4. A plastic lens according to claim 1, wherein said plastic material is a copolymer containing acrylate or acrylate compound, or a mixture containing a polymer of acrylate or acrylate compound.

5. A plastic lens according to claim 4, wherein said plastic material is MS resin.

6. A plastic lens according to claim 5, wherein a compounding ratio of methyl methacrylate (MMA) and sthylene (St) of said MS resin is 20/80≦MMA/St≦100/0 (=PMMA).

7. A plastic lens according to claim 1, wherein said plastic material is a copolymer containing aromatic carbonate or aromatic carbonate compound or a mixture containing polymer of aromatic carbonate or aromatic carbonate compound.

8. A plastic lens according to claim 7, wherein said plastic material is a copolymer of aromatic carbonate or aromatic carbonate compound and sthylene or sthylene compound, or a mixture of polymer of aromatic carbonate or aromatic carbonate compound and polymer of sthylene or sthylene compound.

9. A plastic lens according to claim 8, wherein weights Mpc and Mps of the constituents of aromatic carbonate or aromatic carbonate compound and sthylene or sthylene compound, or the polymer or aromatic carbonate or aromatic carbonate compound and the polymer of sthylene or sthylene compound meet a relation of $$25/75 \leq Mpc/Mps \leq 90/10$$

10. A plastic lens according to claim 1, wherein said plastic material is norbornene resin.

11. A plastic lens according to claim 1, wherein said plastic lens is used for a laser beam printer.

12. A plastic lens according to claim 1, wherein said plastic lens is used for an optical system of an optical pickup.

13. A plastic lens for use in an optical system for a laser light source made of a plastic material having a modulus of photoelasticity at 632.8 nm of larger than zero and no larger than $60 \times 10^{-13}$ cm$^2$/dyne and having a product W×D/H of larger than zero and no larger than 0.2, where D is a maximum thickness of the plastic lens along an optical along an optical axis in a light beam effective diameter, H is a lens outer diameter and W (%) is a saturation moisture absorption factor at a temperature of 50° C. and humidity of 95%.

14. A plastic lens according to claim 13, wherein said plastic material is amorphous or crystalline olefin resin.

15. A plastic lens according to claim 13, wherein said plastic material is PMMA resin.

16. A plastic lens according to claim 13, wherein said plastic material is a copolymer containing aromatic carbonate or aromatic carbonate compound or a mixture containing polymer of aromatic carbonate or aromatic carbonate compound.

17. A plastic lens according to claim 16, wherein said plastic material is a copolymer of aromatic carbonate or aromatic carbonate compound and sthylene or sthylene compound, or a mixture of polymer of aromatic carbonate or aromatic carbonate compound and polymer of sthylene or sthylene compound.

18. A plastic lens according to claim 17, wherein weights Mpc and Mps of the constituents of aromatic carbonate or aromatic carbonate compound and sthylene or sthylene compound, or the polymer or aromatic carbonate or aromatic carbonate compound and the polymer of sthylene or sthylene compound meet a relation of $$25/75 \leq Mpc/Mps \leq 90/10$$

19. A plastic lens according to claim 13, wherein said plastic material is norbornene resin.

20. A plastic lens according to claim 13, wherein said plastic lens is used for a laser beam printer.

21. A plastic lens for use in an optical system for a laser light source made of a plastic material having a product $W \times D/H$ of larger than zero and no larger than 0.2, where D is a maximum thickness of the plastic lens along an optical axis in a light beam effective diameter, H is a lens outer diameter and W (%) is a saturation moisture absorption factor at a temperature of 50° C. and a humidity of 95%.

22. A plastic lens according to claim 21, wherein said plastic material is amorphous or crystalline olefin resin.

23. A plastic lens according to claim 21, wherein said plastic material is PMMA resin.

24. A plastic lens according to claim 21, wherein said plastic material is a copolymer containing aromatic carbonate or aromatic carbonate compound or a mixture containing polymer of aromatic carbonate or aromatic carbonate compound.

25. A plastic lens according to claim 24, wherein said plastic material is a copolymer of aromatic carbonate or aromatic carbonate compound and sthylene or sthylene compound, or a mixture of polymer of aromatic carbonate or aromatic carbonate compound and polymer or sthylene or sthylene compound.

26. A plastic lens according to claim 25, wherein weights Mpc and Mps of the constituents of aromatic carbonate or aromatic carbonate compound and sthylene or sthylene compound, or the polymer or aromatic carbonate or aromatic carbonate compound and the polymer of sthylene or sthylene compound meet a relation of $$25/75 \leq Mpc/Mps \leq 90/10$$

27. A plastic lens according to claim 21, wherein said plastic material is norbornene resin.

28. A plastic lens according to claim 21, wherein said plastic lens is used for a laser beam printer.

29. A laser scanning optical system comprising:
a laser light source;
a deflector for deflecting a laser beam from said laser light source; and
an imaging optical system for imaging the laser beam from said laser light source, said imaging optical system including at least a plastic lens made of a plastic material having a modulus of photoelasticity at 632.8 nm of larger than zero and no larger than $60 \times 10^{-13}$ cm$^2$/dyne and having a product $W \times D/H$ of larger than zero and no larger than 0.2, where D is a maximum thickness of the plastic lens along an optical axis in a light beam effective diameter, H is a lens outer diameter and W (%) is a saturation moisture absorption factor at a temperature of 50° C. and humidity of 95%.

30. A laser scanning optical system according to claim 29, wherein said plastic material is amorphous or crystalline olefin resin.

31. A laser scanning optical system according to claim 29, wherein said plastic material is polymethyl methacrylate (PMMA) resin.

32. A laser scanning optical system according to claim 29, wherein said plastic material is a copolymer containing aromatic carbonate or aromatic carbonate compound or a mixture containing polymer of aromatic carbonate or aromatic carbonate compound.

33. A laser scanning optical system according to claim 32, wherein said plastic material is a copolymer of aromatic carbonate or aromatic carbonate compound and sthylene or sthylene compound, or a mixture of polymer of aromatic carbonate or aromatic carbonate compound and polymer of sthylene or sthylene compound.

34. A laser scanning optical system according to claim 33, wherein weights Mpc and Mps of the constituents of aromatic carbonate or aromatic carbonate compound and sthylene or sthylene compound, or the polymer or aromatic carbonate or aromatic carbonate compound and the polymer of sthylene or sthylene compound meet a relation of $$25/75 \leq Mpc/Mps \leq 90/10.$$

35. A laser scanning optical system according to claim 29, wherein said plastic material is norbornene resin.

36. A laser scanning optical system according to claim 29, wherein said plastic lens is a collimator lens.

37. A laser beam printer comprising:
a laser light source;
a deflector for deflecting a laser beam from said laser light source;
a photosensitive drum; and
an imaging optical system for imaging the laser beam from said laser light source onto said photosensitive drum, said imaging optical system including a least a plastic lens made of a plastic material having a modulus of photoelasticity at 632.8 nm of larger than zero and no larger than $60 \times 10^{-13}$ cm$^2$/dyne and having a product $W \times D/H$ of larger than zero and no larger than 0.2, where D is a maximum thickness of the plastic lens along an optical axis in a light beam effective diameter, H is a lens outer diameter and W (%) is a saturation moisture absorption factor at a temperature of 50° C. and humidity of 95%.

38. A laser beam printer according to claim 37, wherein said plastic material is amorphous or crystalline olefin resin.

39. A laser beam printer according to claim 37, wherein said plastic material is PMMA resin.

40. A laser beam printer according to claim 37, wherein said plastic material is a copolymer containing aromatic carbonate or aromatic carbonate compound or a mixture containing polymer of aromatic carbonate or aromatic carbonate compound.

41. A laser beam printer according to claim 40, wherein said plastic material is a copolymer of aromatic carbonate or aromatic carbonate compound and sthylene or sthylene compound, or a mixture of polymer of aromatic carbonate or aromatic carbonate compound and polymer of sthylene or sthylene compound.

42. A laser beam printer according to claim 41, wherein weights Mpc and Mps of the constituents of aromatic carbonate or aromatic carbonate compound and sthylene or sthylene compound, or the polymer or aromatic carbonate or aromatic carbonate compound and the polymer of sthylene or sthylene compound meet a relation of $$25/75 \leq Mpc/Mps \leq 90/10.$$

43. A laser beam printer according to claim 37, wherein said plastic material is norbornene resin.

44. A laser beam printer according to claim 37, wherein said plastic lens is a collimator lens.

45. A laser scanning optical system comprising:
a laser light source;
a deflector for deflecting a laser beam from said laser light source; and
an imaging optical system for imaging the laser beam from said laser light source, said imaging optical system including at least a plastic lens made of a plastic material having a product $W \times D/H$ of larger than zero and no larger than 0.2, where D is a maximum thickness of the plastic lens along an optical axis in a light beam effective diameter, H is a lens outer diameter and W (%) is a saturation moisture absorption factor at a temperature of 50° C. and humidity of 95%.

46. A laser scanning optical system according to claim 45, wherein said plastic material is amorphous or crystalline olefin resin.

47. A laser scanning optical system according to claim 45, wherein said plastic material is PMMA resin.

48. A laser scanning optical system according to claim 45, wherein said plastic material is a copolymer containing aromatic carbonate or aromatic carbonate compound or a mixture containing polymer of aromatic carbonate or aromatic carbonate compound.

49. A laser scanning optical system according to claim 48, wherein said plastic material is a copolymer of aromatic carbonate or aromatic carbonate compound and sthylene or sthylene compound, or a mixture of polymer of aromatic carbonate or aromatic carbonate compound and polymer or sthylene or sthylene compound.

50. A laser scanning optical system according to claim 49, wherein weights Mpc and Mps of the constituents of aromatic carbonate or aromatic carbonate compound and sthylene or sthylene compound, or the polymer or aromatic carbonate or aromatic carbonate compound and the polymer of sthylene or sthylene compound meet a relation of $$25/75 \leq Mpc/Mps \leq 90/10.$$

51. A laser scanning optical system according to claim 45, wherein said plastic material is norbornene resin.

52. A laser scanning optical system according to claim 51, wherein said plastic lens is a collimator lens.

53. A laser beam printer comprising:
a laser light source;
a deflector for deflecting a laser beam from said laser light source;
a photosensitive drum; and
an imaging optical system for imaging the laser beam from said laser light source onto said photosensitive drum, said imaging optical system including a least a plastic lens made of a plastic material having a product $W \times D/H$ of larger than zero and no larger than 0.2, where D is a maximum thickness of the plastic lens along an optical axis in a light beam effective diameter, H is a lens outer diameter and W (%) is a saturation moisture absorption factor at a temperature of 50° C. and humidity of 95%.

54. A laser beam printer according to claim 53, wherein said plastic material is amorphous or crystalline olefin resin.

55. A laser beam printer according to claim 53, wherein said plastic material is PMMA resin.

56. A laser beam printer according to claim 53, wherein said plastic material is a copolymer containing aromatic carbonate or aromatic carbonate compound or a mixture containing polymer of aromatic carbonate or aromatic carbonate compound.

57. A laser scanning optical system according to claim 56, wherein said plastic material is a copolymer of aromatic carbonate or aromatic carbonate compound and sthylene or sthylene compound, or a mixture of polymer of aromatic carbonate or aromatic carbonate compound and polymer of sthylene or sthylene compound.

58. A laser beam printer according to claim 57, wherein weights Mpc and Mps of the constituents of aromatic carbonate or aromatic carbonate compound and sthylene or sthylene compound, or the polymer or aromatic carbonate or aromatic carbonate compound and the polymer of sthylene or sthylene compound meet a relation of $$25/75 \leq Mpc/Mps \leq 90/10.$$

59. A laser beam printer according to claim 53, wherein said plastic material is norbornene resin.

60. A laser beam printer according to claim 59, wherein said plastic lens is a collimator lens.

61. An optical system for an optical pickup comprising:
a laser light source;
a photodeflector; and
an optical system for guiding a laser beam from said laser light source, to a recording medium and for guiding the laser beam from the recording medium to said photodetector, said optical system including at least a plastic lens made of a plastic material having a modulus of photoelasticity at 632.8 nm of larger than zero and no larger than $60 \times 10^{-13}$ cm$^2$/dyne and having a product $W \times D/H$ of larger than zero and no larger than 4, where D is a maximum thickness of the plastic lens along an optical axis in a light beam effective diameter, H is a lens outer diameter and W (%) is a saturation moisture absorption factor at a temperature of 50° C. and humidity of 95%.

62. An optical system for an optical pickup according to claim 61, wherein said plastic material is PMMA resin.

63. An optical system for an optical pickup according to claim 61, wherein said plastic material is a copolymer containing acrylate or acrylate compound, or a mixture containing a polymer of acrylate or acrylate compound.

64. An optical system for an optical pickup according to claim 61, wherein said plastic lens is an objective lens.

65. An optical system for an optical pickup comprising:
a laser light source;

a photodeflector; and an optical system for guiding a laser beam from said laser light source, to a recording medium and for guiding the laser beam from the recording medium to said photodetector, said optical system including at least a plastic lens made of a plastic material having a product $W \times D/H$ of larger than zero and no larger than 4, where D is a maximum thickness of the plastic lens along an optical axis in a light beam effective diameter, H is a lens outer diameter and W (%) is a saturation moisture absorption factor at a temperature of 50° C. and humidity of 95%.

66. An optical system for an optical pickup according to claim 65, wherein said plastic material is PMMA resin.

67. An optical system for an optical pickup according to claim 65, wherein said plastic material is a copolymer containing acrylate or acrylate compound, or a mixture containing a polymer of acrylate or acrylate compound.

68. An optical system for an optical pickup according to claim 65, wherein said plastic lens is an objective lens.

* * * * *

UNITED STATES PATENT AND TRADEMARK OFFICE
CERTIFICATE OF CORRECTION

PATENT NO. : 5,408,360

DATED : April 18, 1995

INVENTOR : HIROSHI NAKANISHI

It is certified that errors appear in the above-identified patent and that said Letters Patent is hereby corrected as shown below:

COLUMN 3

Line 10, "such the" should read --such an--.

COLUMN 5

Table 1, "sthylene" should read --styrene--, both occurrences, and "Polysthylene" should read --Polystyrene;

Line 25, "lene" should read --rena-;

Line 30, "sthylene" should read --styrene--;

Line 39, "sthylene" should read --styrene--; and

Line 48, "sthylene" should read --styrene--.

COLUMN 6

Line 17, "sthylene" should read --styrene--;

Line 21, "sthylene" should read --styrene--; and

Line 57, "made" should read --made of--.

COLUMN 7

Table 4, "sthylene" should read --styrene-- and "Polysthylene" should read --Polystyrene--.

UNITED STATES PATENT AND TRADEMARK OFFICE
CERTIFICATE OF CORRECTION

PATENT NO. : 5,408,360
DATED : April 18, 1995
INVENTOR : HIROSHI NAKANISHI

It is certified that errors appear in the above-identified patent and that said Letters Patent is hereby corrected as shown below:

COLUMN 9

Line 2, "such the" should read --such a--; and

Line 35, "is" (second occurrence) should read --and is--.

COLUMN 10

Line 13, "sthylene" should read --styrene--;

Line 22, "sthylene or sthylene" should read --styrene or styrane--;

Line 25, "sthylene or sthylene" should read --styrene or styrene--;

Line 28, "sthy-" should read --sty--;

Line 29, "lene or sthylene" should read --rene or styrene--;

Line 31, "sthylene or sthylene" should read --styrene or styrene--;

Line 49, "along an optical" (second occurrence) should be deleted;

Line 65, "sthylene or sthylene" should read --styrene or styrene--; and

Line 68, "sthylene or sthylene" should read --styrene or styrene--.

UNITED STATES PATENT AND TRADEMARK OFFICE
CERTIFICATE OF CORRECTION

PATENT NO. : 5,408,360

DATED : April 18, 1995

INVENTOR : HIROSHI NAKANISHI

It is certified that errors appear in the above-identified patent and that said Letters Patent is hereby corrected as shown below:

COLUMN 11

Line 3, "sthy-" should read --styrene--;

Line 4, "lene or sthylene" should read --or styrene--;

Line 6, "sthylene or sthylene" should read --styrene or styrene--;

Line 34, "sthylene or sthylene" should read --styrene or styrene--;

Line 37, "sthylene or sthylene" should read --styrene or styrene--;

Line 40, "sthy-" should read --styrene--;

Line 41, "lene or sthylene" should read --or styrene--; and

Line 43, "sthylene or sthylene" should read --styrene or styrene--.

COLUMN 12

Line 15, "sthylene or sthylene" should read --styrene or styrene--;

Line 17, "sthylene or sthylene" should read --styrene or styrene--;

Line 22, "sthylene or sthylene" should read --styrene or styrene--;

UNITED STATES PATENT AND TRADEMARK OFFICE
CERTIFICATE OF CORRECTION

PATENT NO. : 5,408,360

DATED : April 18, 1995

INVENTOR : HIROSHI NAKANISHI

It is certified that errors appear in the above-identified patent and that said Letters Patent is hereby corrected as shown below:

COLUMN 12

Line 24, "sthylene or sthylene" should read --styrene or styrene--;

Line 65, "sthy-" should read --sty--;

Line 66, "lene or sthylene" should read --rene or styrene--; and

Line 68, "sthylene or sthylene" should read --styrene or styrene--.

COLUMN 13

Line 4, "sthylene or sthylene" should read --styrene or styrene--;

Line 6, "sthylene or sthylene" should read --styrene or styrene--;

Line 41, "sthylene or sthylene" should read --styrene or styrene--;

Line 43, "or sthylene or sthylene" should read --of styrene or styrene--;

Line 48, "sthylene or sthylene" should read --styrene or styrene-- and

Line 50, "sthylene or sthylene" should read --styrene or styrene--.

UNITED STATES PATENT AND TRADEMARK OFFICE
CERTIFICATE OF CORRECTION

PATENT NO. : 5,408,360

DATED : April 18, 1995

INVENTOR : HIROSHI NAKANISHI

It is certified that errors appear in the above-identified patent and that said Letters Patent is hereby corrected as shown below:

<u>COLUMN 14</u>

Line 20, "sthylene or sthylene" should read --styrene or styrene--;

Line 22, "sthylene or sthylene" should read --styrene or styrene--;

Line 27, "sthylene or sthylene" should read --styrene or styrene-- and

Line 29, "sthylene or sthylene" should read --styrene or styrene--.

Signed and Sealed this

Seventeenth Day of October, 1995

BRUCE LEHMAN

*Attest:*

*Attesting Officer*     *Commissioner of Patents and Trademarks*